(12) United States Patent
Fang et al.

(10) Patent No.: US 7,727,631 B2
(45) Date of Patent: Jun. 1, 2010

(54) SYSTEM AND METHOD OF MANUFACTURE OF MULTI-RESIN COMPOSITE ARTICLES

(75) Inventors: Xiaomei Fang, Niskayuna, NY (US); Wendy Wen-Ling Lin, Niskayuna, NY (US); Ming Xie, Beavercreek, OH (US); Scott Roger Finn, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 333 days.

(21) Appl. No.: 11/759,356

(22) Filed: Jun. 7, 2007

(65) Prior Publication Data
US 2008/0305340 A1 Dec. 11, 2008

(51) Int. Cl.
*B29C 70/48* (2006.01)
*B29C 70/06* (2006.01)
*B32B 5/28* (2006.01)
*F04D 29/40* (2006.01)

(52) U.S. Cl. .................. 428/411.1; 264/257; 264/510; 264/511; 415/200; 425/130

(58) Field of Classification Search ........................ None
See application file for complete search history.

(56) References Cited

U.S. PATENT DOCUMENTS 4,902,215 A 2/1990 Seemann, III
5,643,390 A 7/1997 Don et al.
6,048,488 A 4/2000 Fink et al.

FOREIGN PATENT DOCUMENTS

WO 2004028785 A1 4/2004
WO 2004087392 A2 10/2004

OTHER PUBLICATIONS

"Processing and properties of co-injected resin transfer molded vinyl ester and phenolic composites," Emanuele F. Gillio et al., Polymer Composites, Dec. 1999, vol. 20, No. 6 pp. 780-788.

*Primary Examiner*—Kamal A Saeed
(74) *Attorney, Agent, or Firm*—Penny A. Clarke (57) ABSTRACT

A method for manufacturing a multi-resin composite article is provided. The method comprises providing at least one fiber preform in a mold; injecting a plurality of resins into the at least one fiber preform at a plurality of locations on the at least one fiber preform; and forming at least one transition region along a mutual contact surface between the resins. Each of the at least one transition regions is defined by a gradual transition in composition from one of the resins to another of the resins. A multi-resin composite article is also provided. The article comprises: at least one fiber preform; a plurality of resins, wherein the at least one fiber preform is infused with the resins; and at least one transition region extending along a mutual contact surface between respective ones of the resins. A system for manufacturing such a multi-resin composite article is also provided.

27 Claims, 6 Drawing Sheets

SYSTEM AND METHOD OF MANUFACTURE OF MULTI-RESIN COMPOSITE ARTICLES

BACKGROUND

The invention relates generally to the manufacture of multi-resin composite articles. In particular, the invention relates to the manufacture of multi-resin composite articles having reduced stresses at the interface between the resins.

The combination of light-weight and stiffness offered by polymer composites makes them attractive candidates for structural components in many automotive, aerospace, infrastructure, and other applications. Currently, the components are fabricated individually and joined together by adhesive bonding or mechanical fastening. These joining processes are laborious, burdensome and may result in complications during assembly and inspection. The joints may lead to early failure under high-stress environment, as a result of large stress concentrations at such joints.

Fabrication of multi-resin composite parts may facilitate integration of parts without joints. Existing techniques for forming multi-resin composite panels, such as those disclosed in U.S. Pat. No. 6,048,488, Fink et al., "One-step resin transfer molding of multifunctional composites consisting of multiple resins," produce sharp transitions at the interface between different resins. Undesirably, abrupt transitions in material properties create high stresses at the interface.

Therefore, there is a need for methods and systems for fabrication of multi-resin composite articles in a single manufacturing process, which result in multi-composite articles having reduced stresses at the interface between different resins.

SUMMARY OF THE INVENTION

The present invention meets these and other needs by providing a manufacturing process to fabricate multi-resin composites. Accordingly, one embodiment of the invention is directed to a method for manufacturing a multi-resin composite article. The method comprises providing at least one fiber preform in a mold; injecting a plurality of resins into the at least one fiber preform, at a plurality of locations on the at least one fiber preform; and forming at least one transition region along a mutual contact surface between the resins. Each of the at least one transition regions is defined by a gradual transition in composition from one of the resins to another of the resins.

Another embodiment of the invention is directed to a multi-resin composite article. The article comprises: at least one fiber preform; a plurality of resins, wherein the at least one fiber preform is infused with the resins; and at least one transition region extending along a mutual contact surface between the resins. The transition region is defined by a gradual transition in composition from one of the resins to another of the resins.

In yet another embodiment of the invention, a system for manufacturing a multi-resin composite article is provided. The system comprises: a mold for receiving at least one fiber preform; a plurality of inlets for supplying a plurality of resins into the at least one fiber preform at a plurality of locations on the at least one fiber preform; and at least one outlet for applying a pressure gradient to the at least one fiber preform and the resins. The inlets and the at least one outlet are configured to form at least one transition region along a mutual contact surface between the resins. Each of the at least one transition regions is defined by a gradual transition in composition from one of the resins to another of the resins.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Referring to the drawings in general, it will be understood that the illustrations are for the purpose of describing particular embodiments of the invention and are not intended to limit the invention thereto.

Figure 1:
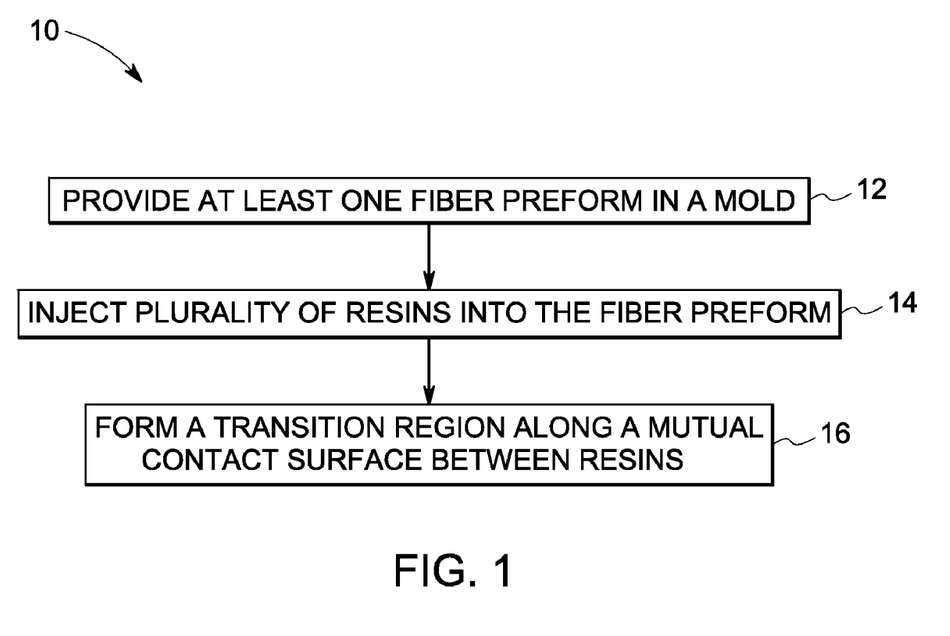
FIG. 1 is a flow chart of a method of forming a multi-resin composite, according to one embodiment of the invention.

One embodiment of the invention is directed to a method for manufacturing a multi-resin composite article. FIG. 1 shows a flow chart of the method 10 for manufacturing a multi-resin composite article. The method comprises providing at least one fiber preform in a mold in step 12; injecting a plurality of resins into the at least one fiber preform at a plurality of locations on the at least one fiber preform, in step 14; and forming at least one transition region along a mutual contact surface between the plurality of resins, in step 16. The method may comprise a vacuum infusion process or a pressure injection process, depending on the requirements.

In step 12, at least one fiber preform is provided in a mold. The shape, size and configuration of the mold may depend, in part, on the shape and size of the multi-resin composite article to be manufactured. Molds and associated parts are well known in the art and are not described in detail herein.

The method 10 is suitable for manufacturing multi-resin composites comprising resins differing in physical properties. The method 10 facilitates smooth transition regions between dissimilar resins. Typically, each of the at least one transition regions is defined by a gradual transition in composition from one of the resins to another of the resins. In contrast, the methods used conventionally to fabricate multi-resin composites generally create a sharp transition region at the joint between the resins. The gradual transition in composition between dissimilar resins may have benefits due to gradual change in properties compared to abrupt changes in property that may occur at sharp transitions. Such sharp transitions cause higher stresses, which may lead to early failure of joints. The gradual transition region may prevent or mitigate such failures.

In some embodiments, the gradual transition occurs in a direction generally parallel to a surface of the multi-resin composite article. The surface may be planar or may have contours depending on the end use application of the article. This is in contrast with the conventionally known multi-resin composites where multiple resins are integrated one on top of the other and the transition occurs in a direction perpendicular to a surface of the composite article.

Conventionally, separators are used at the transition region between the resins. The inventors have demonstrated that forming a smooth transition region between different resins may be achieved via control of flow of resins at the transition region. In one embodiment, the formation of at least one transition region, in step 16, comprises applying a pressure gradient from an injection region to the transition region. The pressure gradient may assist a flow of the resins, into the transition region, through the at least one fiber preform. As used herein, "injection region" is meant to refer to a location where the resins are introduced into the at least one fiber preform. In one embodiment, applying the pressure gradient comprises applying a vacuum at the transition region. In an alternative embodiment, applying the pressure gradient comprises applying a positive pressure between the injection region and the transition region. In embodiments configured for applying positive pressure, a vent may be provided in the region between the injection regions. Further, in embodiments employing positive pressure, it may be advantageous to maintain almost equal injection pressure for the plurality of resins.

The number and position of the sources of pressure gradient and resin injection partly depends on the specific system design and the resin article configuration. Each resin and vacuum source may be controlled individually using a valve or other means of stopping the flow of material. The flow of resin may be stopped when sufficient resin has entered the mold. The flow may be controlled by properly adjusting the resin gel time and/or measuring the amount of resin that has entered the mold and stopping the flow of resin when a premetered amount of resin has entered the mold, or using a sensor to control the flow of resin into the mold. One skilled in the art would be able to control injection of resins based on the specific requirements.

Figure 2:
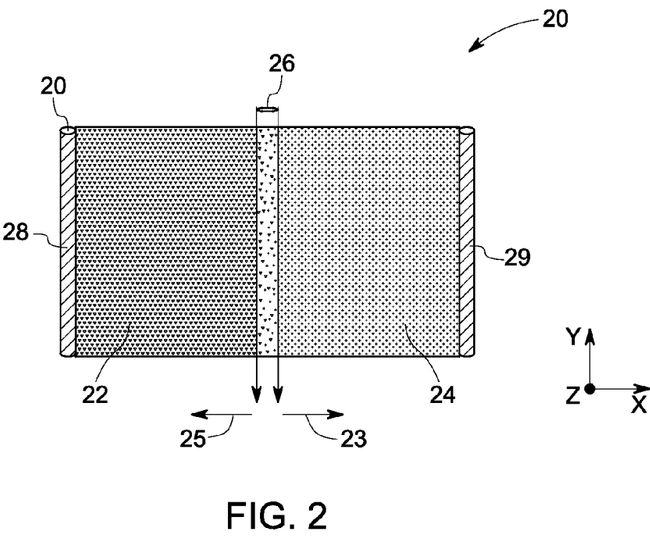
FIG. 2 shows a schematic representation of a two-resin composite article, according to particular embodiments of the invention.

Injection of resins through the fiber preform may be done at different locations. In one embodiment, the resins are injected at regions outside the transition region. In such embodiments, the transition region may be formed by applying a pressure difference at a plurality of locations on the at least one fiber preform to assist a flow of the resins, to the transition region, through the fiber preform. In a particular embodiment, a vacuum line drawn at the transition region may be used to control the flow of resins into the transition region and may be utilized in creating a transition region characterized by a gradual change in composition across the resins. FIG. 2 shows a planar schematic view of a multi-resin composite article 20 comprising two (2) resins 22 and 24 integrated parallel to each other in x-y plane, forming a transition region 26 along a mutual contact surface between the resins 22 and 24. Fabrication of such an article may be accomplished by injecting the resins at injection regions 28 and 29, which are outside the transition region and applying a vacuum at the transition region 26. As indicated in FIG. 2, the transition in composition occurs in directions 23 and 25 that are generally parallel to a surface (x-y plane) of the multi-resin composite article 20.

Figure 5:
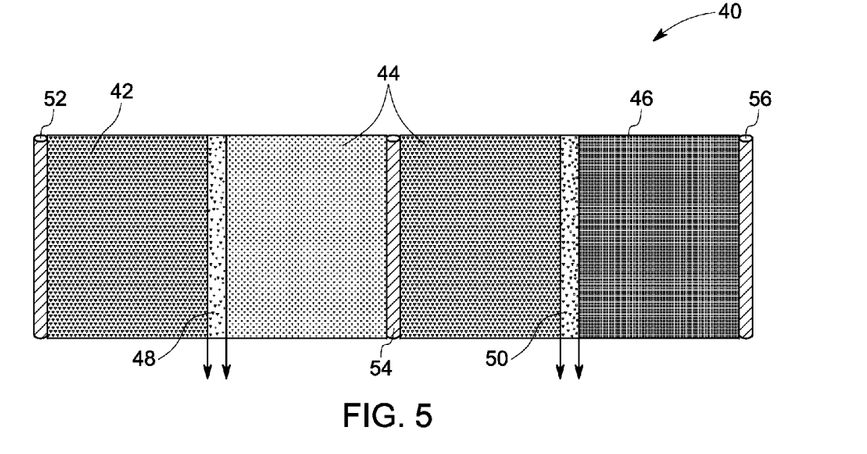
FIG. 5 shows a schematic representation of a three-resin composite article, according to particular embodiments of the invention.

FIG. 5 shows a planar schematic view of a multi-resin composite article 40 comprising three (3) resins 42, 44 and 46 integrated parallel to each other, forming two transition regions 48 (between resins 42 and 44) and 50 (between resins 44 and 46) along respective mutual contact surfaces between the resins. Fabrication of such an article may be accomplished by injecting the resins at injection regions 52, 54 and 56, which are outside the transition regions and applying vacuum at the transition regions 48 and 50.

Figure 8:
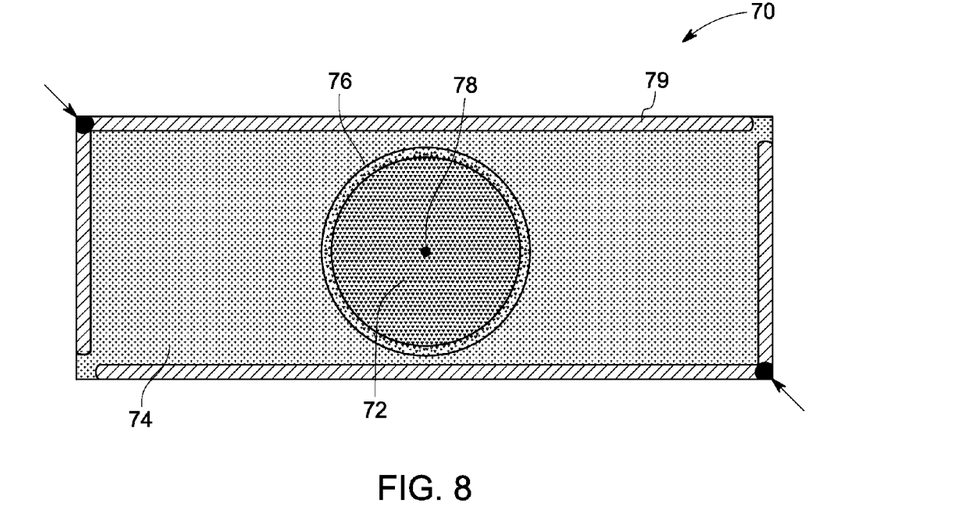
FIG. 8 shows a schematic representation of a multi-resin composite article with nested resin regions, according to particular embodiments of the invention.
Figure 9:
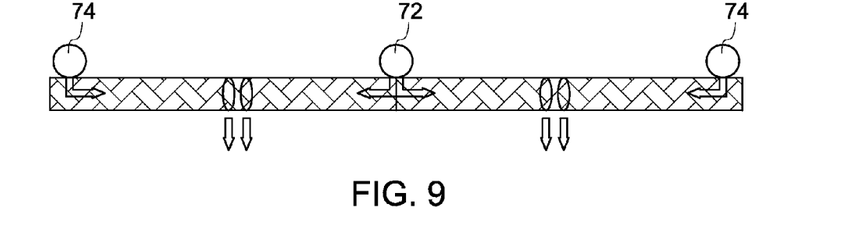
FIG. 9 shows a cross-sectional schematic representation of a multi-resin composite article with nested resin regions, according to particular embodiments of the invention.

FIG. 8 shows a planar schematic view of a multi-resin composite panel 70 comprising two (2) resins 72 and 74 integrated such that resin 74 completely encloses resin 72, forming a circular transition region 76 along a mutual contact surface between the resins. Fabrication of such an article may be accomplished by injecting resin 72 through a spot inlet at the injection region 78 and injecting resin 74 along a line inlet 79, and applying vacuum along the circular transition region 76.

Figure 3:
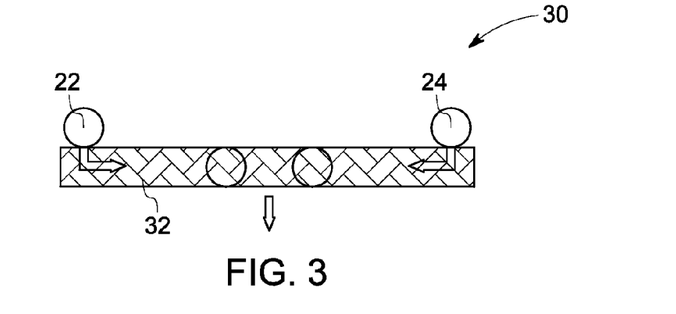
FIG. 3 shows a cross-sectional schematic representation of a two-resin composite article, according to particular embodiments of the invention.
Figure 4:
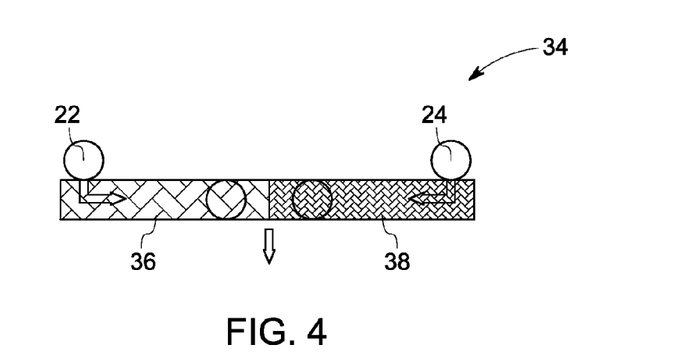
FIG. 4 shows a cross-sectional schematic representation of a two-resin composite article, according to particular embodiments of the invention.
Figure 6:
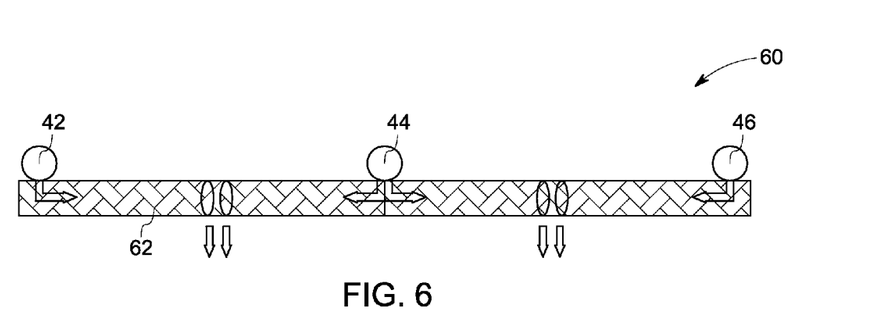
FIG. 6 shows a cross-sectional schematic representation of a three-resin composite article, according to particular embodiments of the invention.
Figure 7:
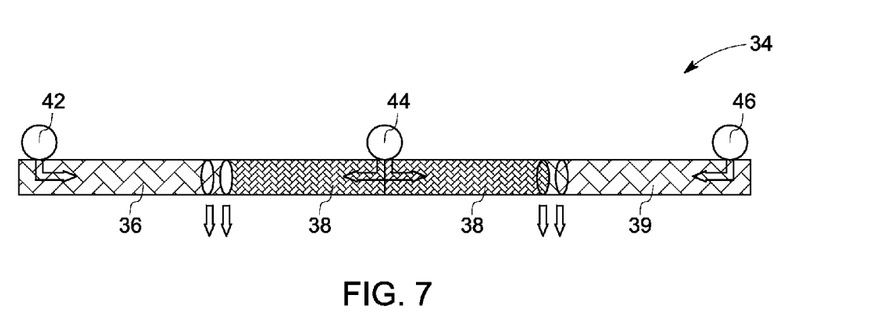
FIG. 7 shows a cross-sectional schematic representation of a three-resin composite article, according to particular embodiments of the invention.

Certain embodiments of the invention facilitate fabrication of multi-resin, multi-fabric composites. As used herein, "multi-fabric composite" is meant to encompass a composite including more than one type of fiber and/or more than one type of preform. In one embodiment, the "multi-fabric composite" comprises more than one type of fiber. In another embodiment, "multi-fabric composite" comprises more than one type of preform. The different types of fibers and preforms are discussed in detail below. FIGS. 3 and 4 show cross-sectional schematics of a dual-resin composite article 30 comprising two resins infused with a single fiber preform 32 (FIG. 3) and a multi-resin composite article 34 comprising two resins infused with two different fabrics 36 and 38 (FIG. 4). FIGS. 6 and 7 show cross-sectional schematics of a three-resin composite article 60 comprising three resins infused with a single preform 62 (FIG. 6) and a multi-resin composite 64 comprising three resins infused with three different fabrics 36, 38, and 39 (FIG. 7).

The resins comprise any of a variety of curable liquid resins known in the art. Examples of suitable resins include but are not limited to, an epoxy, a polyester, a vinylester, a phenolic resin, an acrylic resin, polyurethane resin, a bismaleimide, a polyamide, a polyimide, and a dicyclopentadiene. The resins may be catalyzed for high temperature cure or room temperature cure and for various cures times as is compatible with the needs of the process. The resins may be properly catalyzed and degassed prior to injection into the fiber preform. The wide variety of useful resins and the methods of preparing the resins are all widely known in the art. One skilled in the art would know how to choose a suitable resin and a process it depending on the end use application.

The process is suitable for infusing both similar and dissimilar resins. Generally, the resins comprise at least two resins with differing physical characteristics. For example, the resins may have different dielectric constants, different thermal conductivity, different mechanical strength, different corrosion resistance, and the like. In certain embodiments, the resins infused together are chemically compatible. They may be infused into a single part/panel or article in a single manufacturing step. Conventionally, resins differing in physical characteristics are made into panels/parts individually and joined together by adhesive bonding or mechanical fastening. As noted above, these joining processes are laborious, burdensome and may result in complications during assembly and inspection. Further, the joints may lead to early failure under high-stress environment, as a result of large stress concentrations at such joints. Certain embodiments of the invention facilitate design and manufacture of composite articles comprising multiple resins forming a smooth transition region along one or more mutual contact surfaces between the resins.

Fiber preforms typically comprise fabric architecture including a plurality of fibers. The fibers may be continuous or non-continuous fibers. Suitable examples of fiber materials include, but are not limited to, carbon, glass, polyimide, polyethylene, polypyridobisimidazole, boron, p-phenylenetherephtalamide, ceramic, aromatic polyamide, and silicon carbide. In a multi-resin composite, the different resins may be infused into the same or different fabric materials, as per the requirement. There are many types and configurations of fibers and yarns made from fibers, known in the art. The yarns may be formed into many different types of assemblages including weaves, braids, and knits as well as short and long fiber mats. In some embodiments, the fiber preform may comprise a stitched fabric. In a multi-resin composite article, the different resins may be infused into the same or different fibers and into the same or different preform types, as per the requirement. For example, different resins may be infused into fiber preforms comprising different numbers of strands and/or fiber directions and/or weaving or braiding patterns. One skilled in the art would know how to choose a suitable fiber preform depending on the end use application.

The preform may also include inserts of various types, non-limiting examples of which include foam cores, honeycomb cores, balsa wood, metal inserts and reinforcements. Additionally, the preform may contain sensors or other devices.

The multi-resin infusion process disclosed herein provides flexibility in resin choices and fiber lay-up to accommodate the mechanical design needs. The process facilitates integration of multiple resin composites without bolts and nuts. This in turn could facilitate integration of different components in an overall structure. Integration of components reduces part count as well as secondary fit up and joining operations. The method disclosed herein has been successfully demonstrated in elevated-temperature infused resin systems to produce high quality, void-free composite panels. The inventors have demonstrated that the transition region is well controlled even when one of resins reaches the transition area first.

Another embodiment of the invention is directed towards a multi-resin composite article. The multi-resin composite article has one or more similar or dissimilar resins. FIG. 2 shows a planar schematic view of a multi-resin composite article 20 comprising two (2) resins 22 and 24 integrated parallel to each other, forming a transition region 26 along a mutual contact surface between the resins 22 and 24. As shown in the cross sectional view in FIG. 3, the composite article 20 comprises at least one fiber preform 32. The at least one fiber preform 32 is infused with the resins 22 and 24. The composite article 20 has at least one transition region 26 extending along a mutual contact surface between the resins 22 and 24. In this example, the two (2) resin regions are parallel to each other. The transition region 26 is defined by a gradual transition in composition from one of the resins to another of the resins. In certain embodiments, the multi-resin composite article may comprise more than two resins. For example, schematic representation of a multi-resin composite article 40 comprising three (3) resins 42, 44, and 46 is shown in FIG. 5. In this example, the three (3) resin regions are parallel to each other. In certain embodiments, the multi-resin composite article may comprise nested resin regions.

FIG. 8 shows a schematic representation of a multi-resin composite article 70 comprising resins 72 and 74, wherein resin 72 is enclosed by resin 74. In all the above embodiments, the transition in composition occurs in a direction generally parallel to a surface of the multi-resin composite article. The gradual transition in composition at the transition region provides distinct advantages to the composite article in terms of mitigating or preventing failure at the transition regions. In embodiments where a vacuum line drawn at the transition region is used in controlling the formation of the transition region, the width of the transition region, in part, depends on the width of a single vacuum line and/or the spacing between two vacuum lines. In a particular embodiment, the transition region is at least about 6 inches. In another embodiment, the transition region is at least about 0.25 inches.

The multi-resin composite article comprises any of the known resin materials including the materials described above in the method embodiments. In a particular embodiment, the multi-resin composite comprises at least one brittle and one toughened resin, as described above. The fiber material and preform types may be chosen based on the end use application as discussed in detail above.

Articles comprising a multi-resin composite with a controlled transition region across dissimilar resins are attractive for many applications. The advantages of such articles could be utilized in integrating different components in a system requiring differing resin types in different regions. Examples of potential applications of embodiments of the present invention include structural components in many automotive, aerospace, infrastructure, and other applications. Articles with multi-resin composites as described in the above embodiments are especially attractive for aircraft structures. Such articles may be used to integrate different components of an aircraft structure such as a fan containment case, an integrated inlet, an aft barrel, and the like. Alternatively, it may be used to integrate different parts of a same structure such as, for example, a fan containment case.

Figure 10:
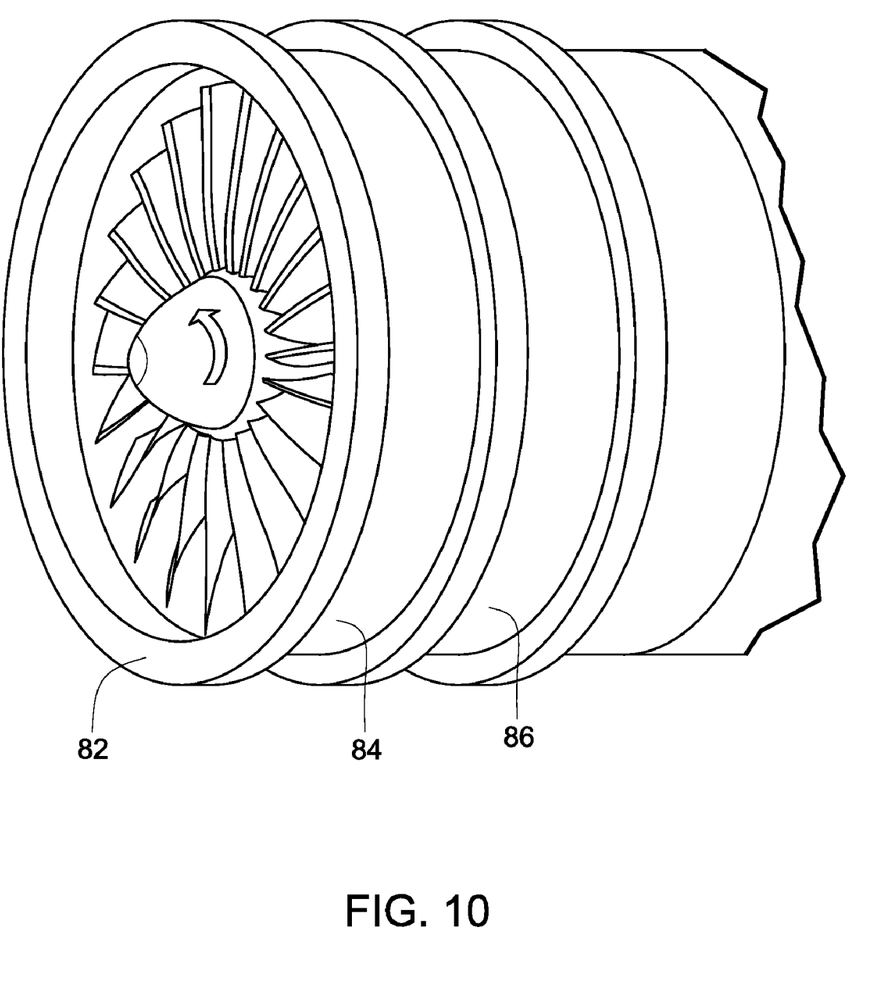
FIG. 10 illustrates a schematic of a turbofan of an aircraft structure.

FIG. 10 shows a schematic of an aircraft structure such as a turbofan 80 showing different components such as an integrated inlet 82, an fan containment case 84, and an aft barrel 86. Typically, these components require different resin types and hence are fabricated as individual parts and then fastened together. For example, the fan containment case desirably comprise brittle resins and the integrated inlet comprises a toughened resin for better performance. Generally, the fan containment case functions as a projectile barrier in a blade-out event. Tests have shown that composites with brittle resins and complex fabric architecture perform better under ballistic impact event. These characteristics, on the other hand, result in composites with low compression, low fatigue, and low interlaminar shear properties. Most other composite applications require high compression, high interlaminar shear, high fatigue and high tensile properties. Hence, integration of these parts has proved to be difficult with the conventional panel manufacturing techniques.

An integrated aircraft structure lends itself to a number of embodiments. In one example, the aircraft structure comprises a fan containment case. In such an embodiment, the fan containment case comprises both a toughened resin and a brittle resin, where the toughened resin may be in and near a flange section of the fan containment case, where the case is bolted to the other structures. In another example, the aircraft structure comprises a fan containment case and an integrated inlet. In such embodiments, the fan containment case part of the article comprises a brittle resin and the integrated inlet part of the article comprises a toughened resin. In another embodiment, the aircraft structure comprises a fan containment case and an aft barrel. In such an embodiment, the fan containment case part of the article comprises a brittle resin and the aft barrel part of the article comprises a toughened resin. In another embodiment, the aircraft structure comprises an integrated inlet, a fan containment case and an aft barrel. In such embodiments, the integrated inlet and the aft barrel parts of the article comprises a toughened resin, and the fan containment case part of the article comprises a brittle resin.

The articles in these embodiments of the invention are fundamentally different from those conventionally known in the art. There have been reports of dual resin infusion using in-plane film separators such that the two resins are different across the thickness. Such articles/panels have different resins on the two surfaces of the panel and the abrupt change in composition occurs perpendicular to the surface of the/article/panel. In contrast, in the articles according to some embodiments of the present invention, the gradual transition in composition occurs in a direction generally parallel to a surface of the multi-resin composite article. The inventors have demonstrated fabrication of large high quality multi-resin composite panels without vacuum induced defects including microvoids. Thus such articles facilitate integration of components requiring different resins. For example, the article comprises a brittle resin and a toughed resin, with a smooth transition region between them.

In another embodiment of the invention, a system for manufacturing a multi-resin composite is provided. For the exemplary embodiment shown in FIG. 11, the system 90 comprises a mold 92 for receiving at least one fiber perform 94; a plurality of inlets 96 for supplying a plurality of resins into the at least one fiber preform 94 at a plurality of locations on the fiber perform(s) 94; and at least one outlet 98 for applying a pressure gradient to the fiber perform(s) 94 and the resins. For certain embodiments, the outlet(s) 98 comprises a vacuum outlet 98 that is configured to apply vacuum at respective transition region(s) on the multi-resin composite article to assist a flow of the resins through the fiber perform (s) 94 and into respective transition region(s). The inlets 96 and the outlet(s) 98 are configured to form at least one transition region along a mutual contact surface between the resins. Each transition region is defined by a gradual transition in composition from one of the resins to another of the resins.

Figure 11:
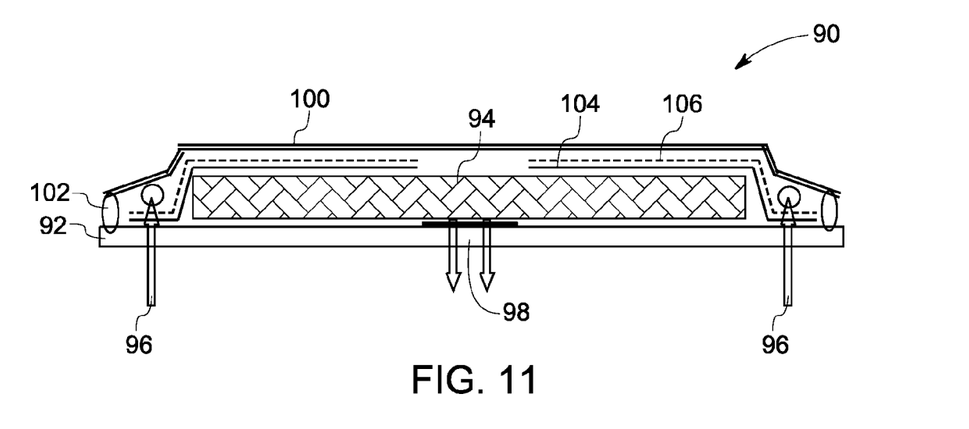
FIG. 11 illustrates a schematic of a system for manufacturing a multi-resin composite article, according to one embodiment of the invention.
Figure 12:
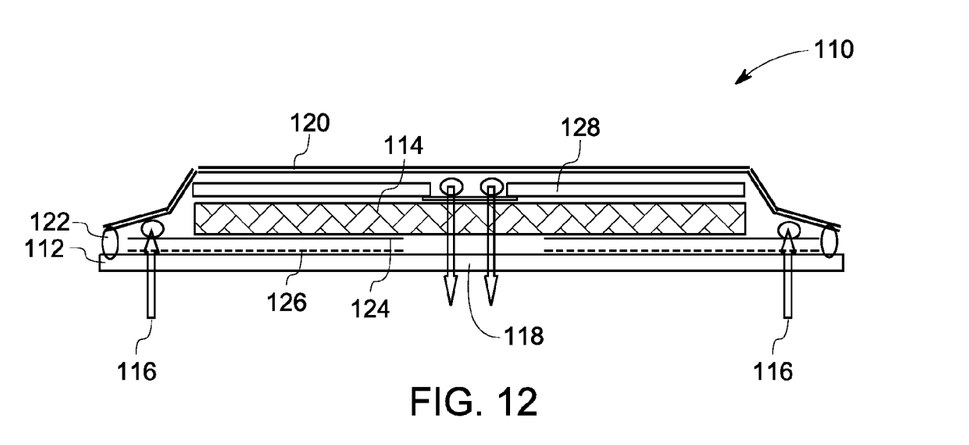
FIG. 12 illustrates a schematic of a system for manufacturing a multi-resin composite article, according to one embodiment of the invention.
Figure 13:
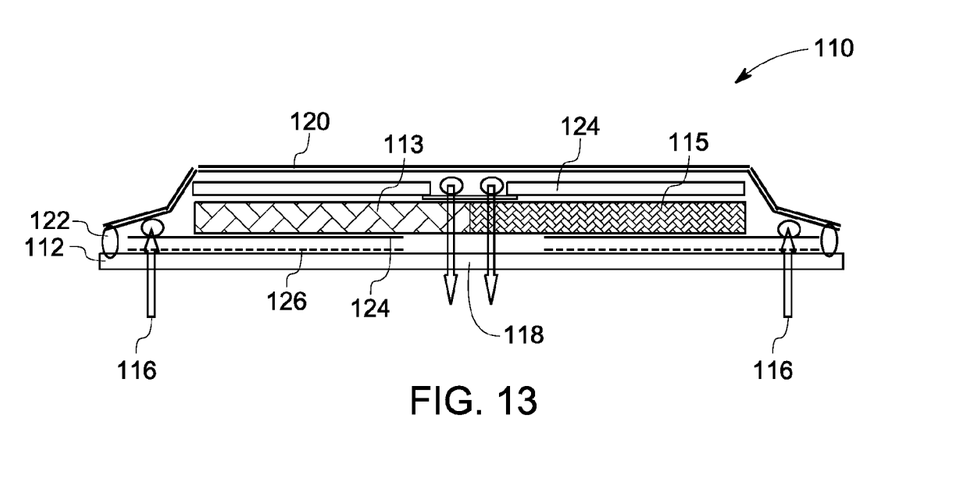
FIG. 13 illustrates a schematic of a system for manufacturing a multi-resin composite article, according to one embodiment of the invention.

FIGS. 11-13 are diagrammatical perspective illustrations of systems for manufacturing multi-resin composites. These figures are provided for illustrative purposes only, and the present invention is not limited to any specific system or configuration thereof. FIG. 11 shows a schematic of a system 90 for manufacturing a multi-resin composite using a top-down infusion. For the illustrated example of FIG. 11, at least one vacuum outlet 98 is provided for applying a pressure gradient to assist the flow of resins into the preform. In addition to the elements discussed above, for the system 90 may further comprise a vacuum bag 100, a seal tape 102 to attach the mold 92 and the vacuum bag 100, and a release film 104, as shown in FIG. 11, for example. The flow media 106 and the porous release film 104 provide quick resin flow path during the infusion process. Resins fill the flow media 106 and the porous release film 104 from the top of the preform 94, and then reach the bottom of the preform 94 via in-plane and through-thickness infusion flow driven by pressure gradient and preform permeability.

For the embodiment illustrated in FIG. 11, the inlets 96 are configured to inject the resins at injection regions outside of the transition region. For the illustrated embodiment, at least one vacuum outlet 98 is disposed at the transition region to assist a flow of the resins to the transition region, through the fiber perform(s) 94, as described in detail with respect to the method embodiments.

FIG. 12 shows a schematic of another system 110 for manufacturing a multi-resin composite article using a bottom-up infusion. As shown in FIG. 12, the system 100 comprises a mold 112 for receiving at least one fiber preform 114; a plurality of inlets 116 for supplying a plurality of resins into the fiber perform(s) 114, at a plurality of locations on the fiber perform(s) 114; and at least one vacuum outlet 118 for applying a pressure gradient to assist the flow of resins into the perform(s) 114. The inlets 116 and the outlet(s) 118 are configured to form at least one transition region along a mutual contact surface between the resins. In some embodiment, the plurality of resins comprise at least a brittle and a toughened resin. In addition, the system 100 may further comprise a vacuum bag 120, a seal tape 122 to attach the mold 112 and the vacuum bag 120, and a release film 124, as shown for example in FIG. 12. The flow media 126 and the porous release cloth 124 provide quick resin flow path during the infusion process. Resins fill the flow media 126 and the porous release film 124 from the bottom of the preform 114, and then reach the top of the preform 114 via in-plane and through-thickness infusion flow driven by pressure gradient and perform permeability.

FIG. 13 illustrates an exemplary system 110 for fabricating a multi-resin, multi-fabric composite. The example system 110 shown in FIG. 13 employs a bottom-up infusion technique. However, a top down infusion technique could also be used. For the system 110 shown in FIG. 13, the preform may comprise two different fabrics 113 and 115. Moreover, based on the teachings herein, one skilled in the art would know to implement changes in the system design as per the design and composition requirement of the composite article. In one embodiment, the system 90 may be suitable for fabricating an aircraft structure. The system may be utilized to fabricate a multi-resin composite integrating different parts of an aircraft structure as discussed in detail in the article embodiments.

The system described herein facilitates manufacturing of large parts, which may require resins with different characteristics (e.g. toughness, impact resistance, adhesion, etc.) at different locations on the part. This approach also reduces part count as well as secondary fit up and joining operations. Reduction in use of nuts and bolts will also reduce weight. Gradual transition regions between resins reduce high stresses that may be caused by abrupt change in materials at the transition regions. Utilization of multi-resin composite articles not only results in great savings in weight, but also through a reduced number of joining operations, results in significant savings. Integration of components provides advantages during assembly, inspection, parts storage, and movement, resulting in increased reliability and lower cost.

The following example describes the preparation method for making a brittle-toughened epoxy composite. This example is merely illustrative, and the invention is not limited to this example.

EXAMPLE 1

A brittle epoxy resin (fracture toughness G1c less than 1.0 in-lb/in$^2$) and a toughened epoxy resin (fracture toughness G1c ranging from 1.0 to 8.0 in-lb/in$^2$) were introduced into the preform through a setup system of 90. When the brittle resin (22 in FIG. 3), for instance, reached the vacuum line first, the flow front of that resin stayed in the vacuum line area and did not move into the other portion of the panel. The toughened resin (24 in FIG. 3) subsequently reached the vacuum line and a transition area with both the brittle and toughened resins was formed.

EXAMPLE 2

A brittle epoxy resin and a toughened epoxy resin as in Example 1 were introduced into the containment preform through a setup system of 90. The toughened resin was introduced in two locations at both edges of the containment and the brittle resin was introduced in the center in the containment region. When the toughened resins, for instance, reached the vacuum line first, the flow front of that resin stayed in the vacuum line area and did not move substantially across the other side of the further vacuum line. The brittle resin subsequently reached the vacuum line and two transition areas with both the brittle and the toughened resins were formed.

While only certain features of the invention have been illustrated and described herein, many modifications and changes will occur to those skilled in the art. It is, therefore, to be understood that the appended claims are intended to cover all such modifications and changes as fall within the true spirit of the invention. It should be understood that though the above embodiments are discussed with respect to vacuum infusion, the embodiments of the invention may be utilized in other liquid molding techniques.

The invention claimed is:

1. A method for manufacturing a multi-resin composite article, the method comprising:
   providing at least one fiber preform in a mold;
   injecting a plurality of resins into the at least one fiber preform at a plurality of locations on the at least one fiber preform; and
   forming at least one transition region along a mutual contact surface between the resins, wherein each of the at least one transition regions is defined by a gradual transition in composition from one of the resins to another of the resins.

2. The method of claim 1, wherein forming at least one transition region comprises applying a pressure gradient from an injection region to the transition region to assist a flow of the resins into the transition region, though the at least one fiber preform.

3. The method of claim 2, wherein applying the pressure gradient comprises applying a vacuum at the transition region.

4. The method of claim 2, wherein applying the pressure gradient comprises applying a positive pressure between the injection region and the transition region.

5. The method of claim 2, wherein the injection region is outside the transition region, and wherein forming at least one transition region comprises applying a pressure difference, at a plurality of locations on the at least one fiber preform, to assist a flow of the resins to the transition region, though the at least one fiber preform.

6. The method of claim 1, wherein the gradual transition occurs in a direction generally parallel to a surface of the multi-resin composite article.

7. The method of claim 1, wherein the resins comprise at least two resins with differing physical characteristics.

8. The method of claim 1, wherein the multi-resin composite article comprises a part of an aircraft structure.

9. The method of claim 8, wherein the aircraft structure comprises a fan containment case and an integrated inlet.

10. The method of claim 8, wherein the aircraft structure comprises a fan containment case and an aft barrel.

11. The method of claim 8, wherein the aircraft structure comprises an integrated inlet, a fan containment case and an aft barrel.

12. A system for manufacturing a multi-resin composite article, the system comprising:
   a mold for receiving at least one fiber preform;
   a plurality of inlets for supplying a plurality of resins into the at least one fiber preform, at a plurality of locations on the at least one fiber preform; and
   at least one outlet for introducing a pressure gradient to assist a flow of the resins, wherein the inlets and the at least one outlet are configured to form at least one transition region along a mutual contact surface between the plurality of resins, wherein each of the at least one transition regions is defined by a gradual transition in composition from one of the resins to another of the resins.

13. The system of claim 12, wherein the at least one outlet comprises a vacuum outlet that is configured to apply vacuum at respective ones of the at least one transition regions to assist a flow of the resins though the at least one fiber preform and into respective ones of the at least one transition region.

14. The system of claim 12, wherein the inlets are configured to inject the resins outside the transition region, and wherein the at least one outlet is disposed at the transition region to assist a flow of the resins, from the transition region, though the at least one fiber preform.

15. The system of claim 12, wherein the gradual transition occurs in a direction generally parallel to a surface of the multi-resin composite article.

16. The method of claim 1, wherein respective ones of the resins comprise a material selected from the group consisting of an epoxy, a polyester, a vinylester, a phenolic resin, an acrylic resin, polyurethane resin, a bismaleimide, a polyimide, and a dicyclopentadiene.

17. The method of claim 7, wherein the two resins with differing physical characteristics comprises at least a brittle resin and a toughened resin.

18. The method of claim 1, wherein the at least one fiber preform comprises at least one fiber material selected from the group consisting of carbon, glass, polyimide, polyethylene, polypyridobisimidazole, polyphenylenebenzobisoxazole, boron, p-phenylenetherephtalamide, ceramic, aromatic polyamide, silicon carbide, and combinations thereof.

19. The method of claim 1, wherein the fiber preform comprises a plurality of fiber types.

20. The method of claim 1, wherein the fiber preform comprises a plurality of preform types.

21. The method of claim 8, wherein the multi-resin composite article comprises a fan containment case.

22. The method of claim 21, wherein the fan containment case comprises a brittle resin and a toughened resin.

23. The method of claim 9, wherein the fan containment case comprises a brittle resin and the integrated inlet comprises a toughened resin.

24. The method of claim 10, wherein the fan containment case comprises a brittle resin and the aft barrel comprises a toughened resin.

25. The method of claim 11, wherein the integrated inlet comprises a toughened resin, the aft barrel comprises a toughened resin, and the fan containment case comprises a brittle resin.

26. The system of claim 12, wherein the resins comprise at least a toughened resin and a brittle resin.

27. The system of claim 12, wherein the multi-resin composite article comprises a part of an aircraft structure.

* * * * *

UNITED STATES PATENT AND TRADEMARK OFFICE
CERTIFICATE OF CORRECTION

PATENT NO. : 7,727,631 B2
APPLICATION NO. : 11/759356
DATED : June 1, 2010
INVENTOR(S) : Fang et al.

It is certified that error appears in the above-identified patent and that said Letters Patent is hereby corrected as shown below:

In Column 9, Line 63, in Claim 2, delete "though" and insert -- through --, therefor.

In Column 10, Line 8, in Claim 5, delete "though" and insert -- through --, therefor.

In Column 10, Line 40, in Claim 13, delete "though" and insert -- through --, therefor.

In Column 10, Line 46, in Claim 14, delete "though" and insert -- through --, therefor.

Signed and Sealed this

Twenty-third Day of November, 2010

David J. Kappos
*Director of the United States Patent and Trademark Office*